(12) United States Patent
Wang et al.

(10) Patent No.: US 8,078,772 B2
(45) Date of Patent: *Dec. 13, 2011

(54) DIGITAL PHASE RELATIONSHIP LOCK LOOP

(75) Inventors: James Wang, Milpitas, CA (US); Zongjian Chen, Palo Alto, CA (US); James B. Keller, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/908,605

(22) Filed: Oct. 20, 2010

(65) Prior Publication Data
US 2011/0035518 A1    Feb. 10, 2011

Related U.S. Application Data

(63) Continuation of application No. 12/350,008, filed on Jan. 7, 2009, now Pat. No. 7,873,762, which is a continuation of application No. 11/176,520, filed on Jul. 7, 2005, now Pat. No. 7,500,044.

(51) Int. Cl.
*G06F 13/00* (2006.01)
*H03K 5/135* (2006.01)
(52) U.S. Cl. ........................................................ 710/52
(58) Field of Classification Search .................. None
See application file for complete search history.

(56) References Cited

U.S. PATENT DOCUMENTS

| 4,068,199 A | 1/1978 | Madoff |
| 4,357,707 A | 11/1982 | Delury |
| 4,694,326 A | 9/1987 | Demmer |
| 4,864,496 A | 9/1989 | Triolo et al. |
| 4,906,941 A | 3/1990 | Kato et al. |
| 5,323,426 A | 6/1994 | James et al. |
| 5,434,996 A | 7/1995 | Bell |
| 5,467,464 A | 11/1995 | Oprescu et al. |
| 5,754,614 A | 5/1998 | Wingen |
| 5,799,175 A * | 8/1998 | Cassiday et al. .............. 713/400 |
| 5,884,099 A | 3/1999 | Klingelhofer |
| 5,951,635 A | 9/1999 | Kamgar |
| 6,075,833 A | 6/2000 | Leshay et al. |

(Continued)

OTHER PUBLICATIONS

Cummings, et al., "Simulation and Synthesis techniques for Asynchronous FIFO Design with Asynchronous Pointer Comparisons," Sunburst Design, Inc., 2002, pp. 1-18.

(Continued)

*Primary Examiner* — Cheng-Yuan Tseng
(74) *Attorney, Agent, or Firm* — Lawrence J. Merkel; Meyertons, Hood, Kivlin, Kowert & Goetzel, P.C.

(57) ABSTRACT

In one embodiment, an apparatus comprises a first clocked storage device operable in a first clock domain corresponding to a first clock signal. The first clocked storage device has an input coupled to receive one or more bits transmitted on the input from a second clock domain corresponding to a second clock signal. The apparatus further comprises control circuitry configured to ensure that a change in a value of the one or more bits transmitted on the input meets setup and hold time requirements of the first clocked storage device. The control circuitry is responsive to a sample history of one of the first clock signal or the second clock signal to detect a phase relationship between the first clock signal and the second clock signal on each clock cycle to ensure the change meets the setup and hold time requirements.

20 Claims, 5 Drawing Sheets

U.S. PATENT DOCUMENTS

| | | |
|---|---|---|
| 6,606,360 B1 | 8/2003 | Dunning et al. |
| 6,680,874 B1 | 1/2004 | Harrison |
| 6,724,683 B2 * | 4/2004 | Liao .................. 365/189.02 |
| 6,725,388 B1 | 4/2004 | Susnow |
| 6,765,975 B2 | 7/2004 | Dunning et al. |
| 6,917,659 B1 | 7/2005 | Dunning et al. |
| 6,956,776 B1 | 10/2005 | Lowe et al. |
| 7,035,983 B1 | 4/2006 | Fensore |
| 7,100,065 B2 | 8/2006 | Adkisson |
| 7,107,393 B1 | 9/2006 | Sabih |
| 7,116,601 B2 | 10/2006 | Fung |
| 7,248,664 B2 | 7/2007 | Fast et al. |
| 7,287,105 B1 | 10/2007 | Owen et al. |
| 7,310,396 B1 | 12/2007 | Sabih |
| 7,500,044 B2 * | 3/2009 | Wang et al. .................. 710/310 |
| 7,570,534 B2 | 8/2009 | Wang et al. |
| 7,873,762 B2 * | 1/2011 | Wang et al. .................. 710/52 |
| 2005/0268149 A1 | 12/2005 | Sherlock |
| 2006/0190638 A1 * | 8/2006 | Castlebary .................. 710/52 |
| 2006/0277329 A1 | 12/2006 | Paulson et al. |

OTHER PUBLICATIONS

Synopsys, "Design Compiler Ultra Performance Capabilities," Jun. 2004, pp. 1-27.

* cited by examiner $K = F_{WClk}/F_{RClk}$ $R = 1/K$ $H = \{Nm, Pm-1, \ldots, N4, P3, N3, P2\}$ $LBRP_{new} = LBRP_{Current} + R-$ $RBRP_{new} = RBRP_{Current} + (R- + 1ulp)$ WClk Edge OK if:
   LBRP < RBRP; and
   LBRP > hold_time or RBRP < setup_time For $2n/4 + e <= K <= (2n+1)/4$     (Category 2)
   $LBRP_{Init} = nR/2$
   $RBRP_{Init} = 0$ For $(2n+1)/4 <= K <= (2n+2)/4 - e$     (Category 3)
   $LBRP_{Init} = 2 - (n+1)*R/2$
   $RBRP_{Init} = 0$

DIGITAL PHASE RELATIONSHIP LOCK LOOP

This application is a continuation of U.S. patent application Ser. No. 12/350,008, filed Jan. 7, 2009, now U.S. Pat. No. 7,873,762 which is a continuation of U.S. patent application Ser. No. 11/176,520, filed on Jul. 7, 2005, now U.S. Pat. No. 7,500,044.

BACKGROUND

1. Field of the Invention

This invention is related to transmitting data across clock domain boundaries and particularly to using FIFO buffers to transmit data across clock domain boundaries.

2. Description of the Related Art

Electronic systems often have two or more different clock domains, corresponding to different clock signals used in the system. The clock signals that form different clock domains may have different sources, and thus a phase relationship between the clock signals may not be known. The clock signals may have different frequencies. In some cases, the clock signals may have both different sources and different frequencies. Different clock domains may exist on a single integrated circuit, between integrated circuits in a system, or both.

Generally, transmitting data across clock domain boundaries requires some sort of synchronization to ensure that data is safely and accurately captured in the receiving clock domain. FIFO buffers are frequently used to transfer data between clock domains. The transmitting clock domain writes data into the buffer using a write pointer. Subsequently, after the data is known to be stable in the FIFO buffer, the receiving clock domain reads data from the buffer. To prevent overrun when the FIFO buffer is full, and to prevent underrun with the FIFO buffer is empty, FIFO control logic generates empty and full signals. The full signal is generated in the transmitting clock domain, and the empty signal is generated in the receiving clock domain. Typically, the full and empty signals are generated by comparing the read and write pointers. However, to compare the pointers, they must be transmitted between the clock domains.

Typically, the pointers are transmitted between the clock domains by dual-rank synchronizing the pointers (also referred to herein as double synchronizing the pointers). A pair of clocked storage devices are coupled in series, in the clock domain that receives a pointer for comparison. An input to the series connection receives the pointer from the other clock domain. After passing through the series connection, the pointer is considered stable in the clock domain and can be compared.

Double synchronizing is used to avoid metastability problems that may occur if setup/hold times are violated by a transition in the value of the pointer that is generated in the other clock domain. When such violations occur, the value captured by the clocked storage device may oscillate or an unpredictable value may be captured. Unfortunately, double synchronizing also introduces a two clock cycle latency in the clock domain to which the synchronization is performed. This latency complicates the interface to the FIFO buffer and/or complicates the FIFO design for generating the full/empty signals. Furthermore performance may be lost (e.g. the deassertion of the empty signal is delayed from the writing of new data, and thus the reading of the new data is also delayed).

SUMMARY

In one embodiment, an apparatus comprises a first clocked storage device operable in a first clock domain corresponding to a first clock signal. The first clocked storage device has an input coupled to receive one or more bits transmitted on the input from a second clock domain corresponding to a second clock signal. The apparatus further comprises control circuitry configured to ensure that a change in a value of the one or more bits transmitted on the input meets setup and hold time requirements of the first clocked storage device. The control circuitry is responsive to a sample history of one of the first clock signal or the second clock signal to detect a phase relationship between the first clock signal and the second clock signal on each clock cycle to ensure the change meets the setup and hold time requirements.

In another embodiment, a control unit for a FIFO buffer for transferring data between a first clock domain corresponding to a first clock signal and a second clock domain corresponding to a second signal comprises a first clocked storage device clocked by the first clock signal, a second clocked storage device clocked by the second clock signal, a third clocked storage device clocked by the second clock signal, a fourth clocked storage device clocked by the second clock signal, and a mode control unit. The first clocked storage device is configured to store a first pointer to address the FIFO buffer. The second clocked storage device is configured to store a second pointer to address the FIFO buffer. The third clocked storage device is coupled to receive a third pointer that corresponds to the first pointer, the third pointer transmitted from the first clock domain to the second clock domain to be received by the third clocked storage device. The fourth clocked storage device has an input coupled to an output of the third clocked storage device. The mode control unit is configured to select the output of the third clocked storage device to be compared to the second pointer responsive to monitoring a history of samples corresponding to one of the first clock signal or the second clock signal. If a transition in a value of the third pointer, if any, meets setup and hold requirements of the third clocked storage device according to a phase relationship between the second clock signal and the first clock signal as indicated by the history of samples, the mode control unit is configured to select the output of the third clocked storage device.

In yet another embodiment, a method is contemplated for a FIFO buffer for transferring data between a first clock domain corresponding to a first clock signal and a second clock domain corresponding to a second signal, wherein a first pointer in the first clock domain addresses the FIFO buffer and a second pointer in the second clock domain addresses the FIFO buffer. The method comprises monitoring a history of samples corresponding to one of the first clock signal or the second clock signal; generating a third pointer from the first pointer to be transmitted to the second clock domain, the generating including ensuring that transitions in a value of the third pointer occur at times that meet setup and hold requirements in the second clock domain, the generating responsive to the history of samples; and capturing the third pointer in the second clock domain and comparing the third pointer to the second pointer.

In still another embodiment, a control unit for a FIFO buffer for transferring data between a first clock domain corresponding to a first clock signal and a second clock domain corresponding to a second signal comprises a first clocked storage device clocked by the first clock signal, a second clocked storage device clocked by the second clock signal, a pointer generator operable in the first clock domain and coupled to the first clocked storage device, a mode control unit coupled to the pointer generator, and a third clocked storage device clocked by the second clock signal. The first clocked storage device is configured to store a first pointer to address the FIFO buffer. The second clocked storage device is configured to store a second pointer to address the FIFO buffer. The pointer generator is configured to generate a third pointer from the first pointer to be transmitted to the second clock domain, wherein the pointer generator is responsive to one or more control signals to generate the third pointer. The mode control unit is configured to generate the one or more control signals responsive to monitoring a history of samples corresponding to the second clock signal, wherein the mode control unit is configured to generate the one or more control signals to ensure that transitions in a value of the third pointer occur at times that meet setup and hold requirements in the second clock domain. The third clocked storage device is coupled to receive the third pointer from the pointer generator, and the mode control unit is configured to select an output of the third clocked storage device to be compared to the second pointer.

BRIEF DESCRIPTION OF THE DRAWINGS

The following detailed description makes reference to the accompanying drawings, which are now briefly described.

Figure 1:
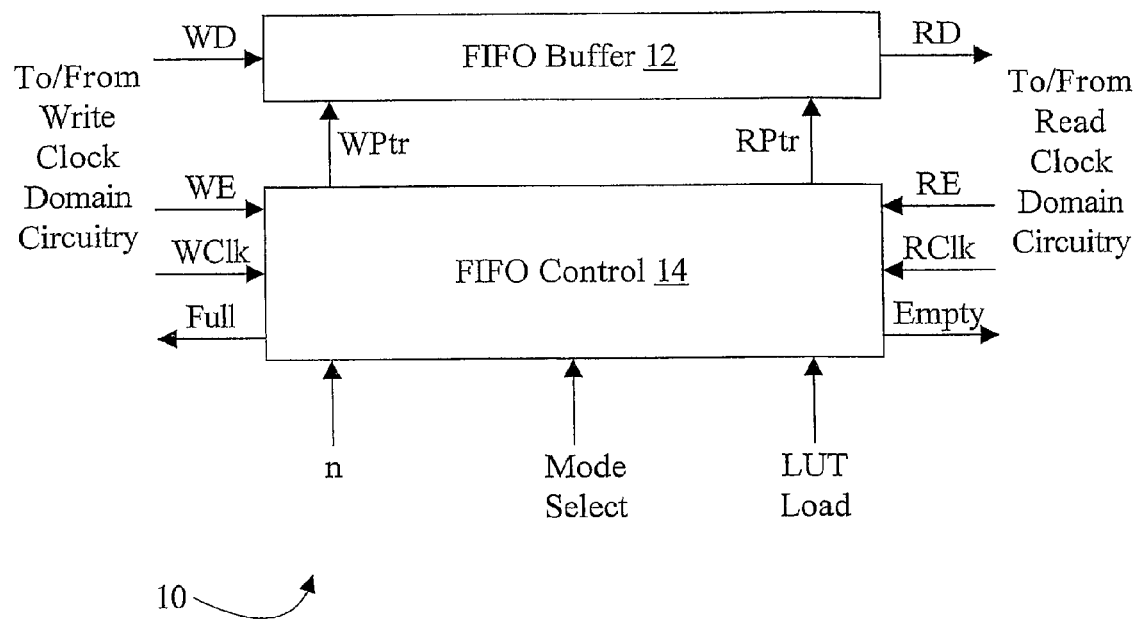
FIG. 1 is a block diagram of one embodiment of a FIFO buffer and a FIFO control unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a FIFO 10 is shown. In the illustrated embodiment, the FIFO 10 includes a FIFO buffer 12 and a FIFO control unit 14. The FIFO buffer 12 is coupled to receive write data (WD) from the write clock domain circuitry and to provide read data (RD) to the read clock domain circuitry. That is, the write clock domain may be the transmitting clock domain with respect to the FIFO 10 and the read clock domain may be the receiving clock domain with respect to the FIFO 10. The FIFO control unit 14 is coupled to provide a write pointer (WPtr) and a read pointer (RPtr) to address the FIFO buffer 12. The FIFO control unit 14 is coupled to receive a write enable (WE) from the write clock domain circuitry, which is asserted to indicate that write data is being written to the FIFO buffer 12, and a write clock signal (WClk) corresponding to the write clock domain. The write data and the write enable are referenced to the WClk. Similarly, the FIFO control unit 14 is coupled to receive a read enable (RE) which is asserted to indicate that read data is being read from the FIFO buffer 12, and a read clock signal (RClk) corresponding to the read clock domain. The read enable is referenced to the RClk. The FIFO control unit 14 is further coupled to provide a full signal to the write clock domain circuitry and an empty signal to the read clock domain circuitry. The FIFO control unit 14 is further coupled to receive an n input, a mode select input, and a lookup table (LUT) load input, which are described in more detail below.

The FIFO buffer 12 comprises a plurality of entries. A given entry may be written with write data provided during a WClk cycle or read to provide read data during a RClk cycle. The WPtr identifies the next entry of the FIFO buffer 12 to be written with received write data, and the RPtr identifies the next entry of the FIFO buffer 12 to be read to produce the read data. The WPtr is in the write clock domain and the RPtr is in the read clock domain. Generally, if the WE is asserted, the WPtr may be adjusted to select the next entry to be written. If the RE is asserted, the RPtr may be adjusted to select the next entry to be read. In the present discussion, the pointers will be described as being incremented to indicate the next entry (wrapping from the uppermost address to zero), although other embodiments may decrement the pointers (wrapping from zero to the uppermost address). The full signal is generated in the write clock domain and indicates to the write clock domain circuitry that the FIFO buffer 12 is full, and subsequent writes are to be delayed until entries are freed by the read clock domain circuitry reading one or more entries. The empty signal is generated in the read clock domain and indicates to the read clock domain circuitry that the FIFO buffer 12 is empty, and subsequent reads are to be delayed until the write clock domain circuitry writes more data into the FIFO buffer 12.

In one embodiment, the frequencies of the WClk signal and the RClk signal may be user-selected among a range of supported frequencies. The frequencies of the WClk signal and the RClk signal need not be the same, and either clock may have a higher frequency than the other. In various embodiments, the frequencies may be statically adjustable (that is, the frequency is determined at reset and another reset is used to select a different frequency) or dynamically adjustable (that is, the frequency may be changed during operation). In one particular implementation, the WClk may be dynamically adjustable and the RClk may be statically adjustable.

In one embodiment, the FIFO 10 may support at least two modes of operation: an advanced mode and a double synchronization (double sync) mode. The mode select input may be used to select the desired mode. The double sync mode may implement double synchronization of one pointer into the opposite clock domain. The advanced mode may transmit a pointer from one clock domain to the other with a latency less than the double synchronization latency, in some embodiments. The advanced mode may ensure that transitions in the value of the pointer meet the setup and hold time requirements of the storage devices in the other clock domain, so that metastability may not be an issue. Accordingly, the pointer may be received into a clocked storage device in the other clock domain and may be used directly, avoiding the clock cycle of latency of the second clocked storage device in the other clock domain that is used in the double synchronization. Viewed in another way, a single synchronization may be used in the advanced mode.

The n input is provided to the FIFO control unit 14 dependent on the ratio of the WClk and RClk frequencies, for use in the advanced mode. Similarly, a lookup table that is used in one embodiment may be loaded using the LUT load input. Additional details are provided below for various embodiments.

Figure 2:
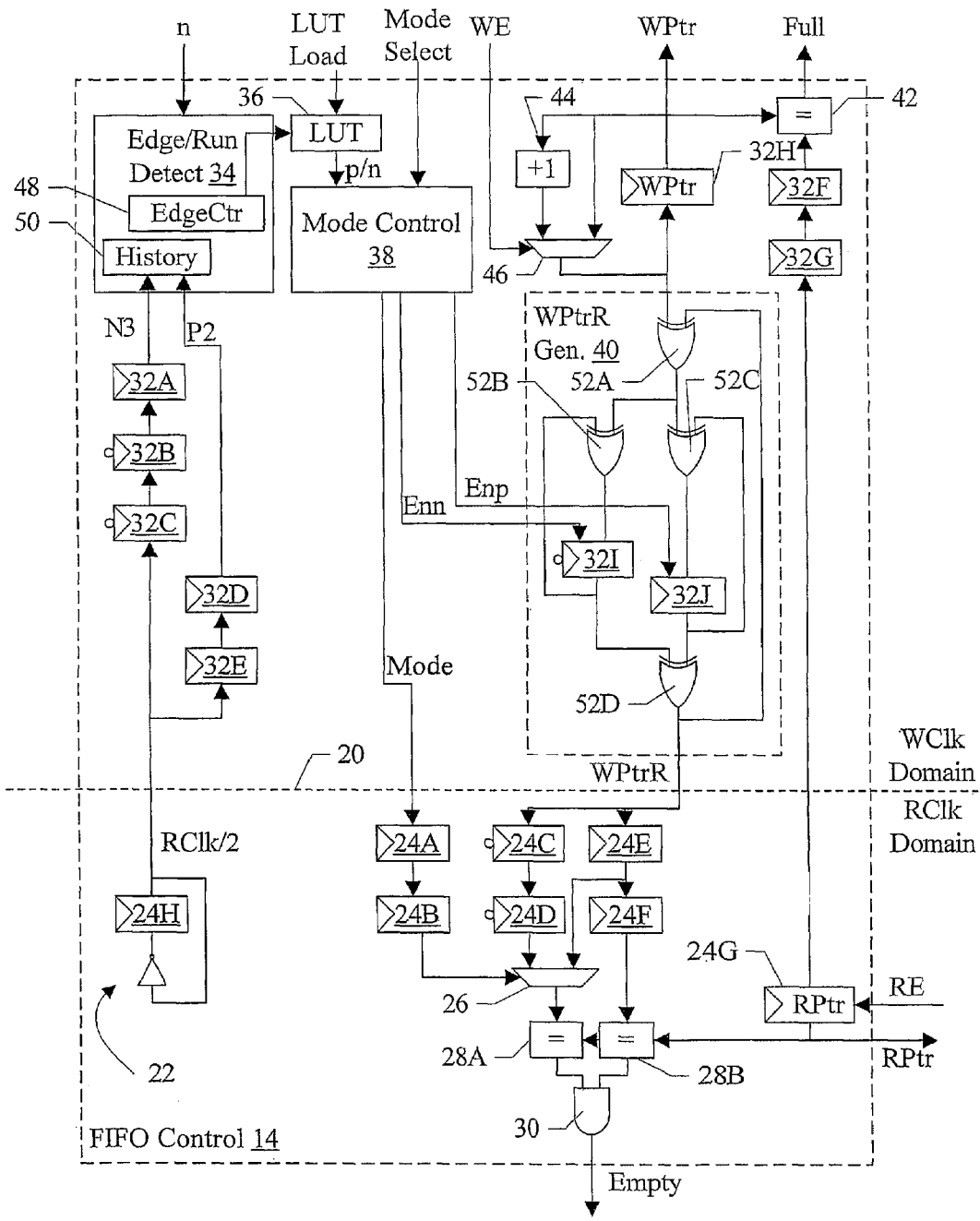
FIG. 2 is a block diagram of one embodiment of the FIFO control unit shown in FIG. 1.

In the embodiment illustrated in FIG. 2, the deassertion of the empty signal in response to the writing of new data to an empty FIFO buffer 12 may be generated in the advanced mode with a lower latency than a double synchronization may entail. Thus, the latency for reading the most recently written data from the FIFO buffer 12 after being empty may be decreased, in some embodiments. In other embodiments, the full signal may be generated in a similar fashion, implementing a similar advanced mode synchronization of the read pointer to the write clock domain. In still other embodiments, both full and empty signals may be generated in the advanced mode with lower latency. Accordingly, in general, a pointer in one clock domain may be synchronized in the advanced mode to the other clock domain.

In the illustrated embodiments, flops are used to capture various values responsive to a clock signal. Generally, any clocked storage device may be used. A clocked storage device may be any device that is configured to capture input data and store the data under the control of a clock input signal (an enable signal may also control data capture). For example, clocked storage devices may include flops, registers, latches, etc. A clocked storage device may be clocked by a clock signal (that is, it may capture data responsive to the clock signal). Some clocked storage devices are edge triggered (e.g. flops). Edge triggered devices capture data responsive to a defined edge on the clock signal (either the rising edge or the falling edge). That is, the value existing on the input at the time the edge occurs is the value stored in the device. An edge triggered device that is triggered by the falling edge of the clock signal is often referred to as a negative edge device (or neg-edge, for short). An edge triggered device that is triggered by the rising edge of the clock signal is often referred to as a positive edge device (or pos-edge, for short). Other devices open (permitting the passing of data) during a phase of the clock cycle and close (capturing data and holding the data) during the other phase of the clock cycle. Both edge triggered and open/close phase devices may be clocked by a clock signal.

Turning next to FIG. 2, a block diagram of one embodiment of the FIFO control unit 14 is shown. In the embodiment of FIG. 2, the FIFO control unit 14 is divided into a RClk domain and a WClk domain, illustrated by the dotted line 20. Flops in the WClk domain (above the dotted line 20 in FIG. 2) are clocked by the WClk signal and flops in the RClk domain (below the dotted line 20 in FIG. 2) are clocked by the RClk signal. In the illustrated embodiment, the RClk domain portion of the FIFO control unit 14 includes a clock divider circuit 22, flops 24A-24H, multiplexor (mux) 26, comparators 28A-28B, and AND gate 30. The flops 24A-24B and 24E-24H are triggered by the rising edge of RClk (pos-edge) and the flops 24C-24D are triggered by the falling edge of RClk (neg-edge), illustrated by the circles on the clock inputs of the flops 24C-24D. The WCLK domain includes flops 32A-32H, an edge/run detector 34, a lookup table (LUT) 36, a mode control unit 38, a write pointer generator (WPtrR Gen.) 40, a comparator 42, an incrementor 44, and a mux 46. The edge/run detector 34 includes an edge counter 48 and a sample history 50. The WPtrR generator 40 include bitwise exclusive OR (XOR) circuits 52A-52D and flops 32I and 32J. The flops 32A, 32D-32H, and 32J are triggered by the rising edge of WClk (pos-edge) and the flops 32B-32C and 32I are triggered by the falling edge of RClk (neg-edge), illustrated by the circles on the clock inputs of the flops 32B-32C and 32I.

In the illustrated embodiment, the clock divider circuit 22 generates a half-frequency RClk (RClk/2) and provides the RClk/2 to the WClk domain. Particularly, flops 32D and 32E are coupled in series, with the input of flop 32E receiving the RClk/2 signal and the output of the flop 32D coupled to the edge/run detector 34 (particularly, the sample history 50). The flops 32A-32C are coupled in series, with the input of the flop 32C receiving the RClk/2 signal and the output of the flop 32A coupled to the edge/run detector 34 (particularly, the sample history 50). The edge/run detector 34 is coupled to the LUT 36 (particularly, the edge counter 48) and to the n input. The LUT 36 is coupled to the LUT load input and to the mode control unit 38, which is also coupled to the mode select input and to provide a mode to the RClk domain and enable control signals (Enn and Enp) to the WPtrR generator 40 (particularly, to the flops 32I and 32J). The mux 46 is coupled to the output of the incrementor 44 and to the output of the flop 32H. The flop 32H is also coupled to the input of the incrementor and to the comparator 42, as well as output to the FIFO buffer 12 as the write pointer (WPtr). The output of the mux 46 is coupled to the WPtrR generator 40 (particularly to an input of the bitwise XOR circuit 52A). The mux select line 46 is controlled by the write enable (WE) input. The flops 32F-32G are coupled in series, with the input of the flop 32G receiving the RPtr from the RClk domain and the output of the flop 32F coupled to the comparator 42. The output of the comparator 42 is the full signal. The other input of the bitwise XOR circuit 52A is coupled to the output of the bitwise XOR circuit 52D, which is also transmitted as the write pointer to the RClk domain (WPtrR). The output of the bitwise XOR circuit 52A is coupled as an input to the bitwise XOR circuits 52B-52C, which are coupled to the outputs of the flops 32I and 32J, respectively. The outputs of the bitwise XOR circuits 52B-52C are coupled to the inputs of the flops 32I-32J, respectively. The flops 24A-24B are coupled in series, with the input of the flop 24A coupled receiving the mode signal from the WClk domain and the output of the flop 24B coupled as the mux select to the mux 26. The flops 24C-24D are coupled in series, with the input of the flop 24C receiving the WPtrR pointer from the WPtrR generator 40 in the WClk domain and the output of the flop 24D coupled to the mux 26. The other input of the mux 26 is coupled to the output of the flop 24E, which has its input coupled to receive the WPtrR pointer and which is coupled in series with the flop 24F. The flop 24F has its output coupled to the comparator 28B, which also has an input coupled to receive the RPtr from the flop 24G. The comparator 28A is coupled to the output of the mux 26 and to receive the RPtr, and the outputs of the comparators 28A-28B are coupled as inputs to the AND gate 30. The output of the AND gate 30 is the empty signal. The output of the flop 24G is the RPtr to the FIFO buffer 12, and the flop 24G is coupled to receive the read enable (RE).

The embodiment illustrated in FIG. 2 may be used in the advanced mode if the WClk is operated at a frequency approximately equal to or higher than the frequency of the RClk. If the RClk frequency is higher than the WClk frequency, the double sync mode may be used.

If the FIFO control unit 14 is operating in the advanced mode, the mode control unit 38 may generate the mode signal to the RClk domain in a state indicating the advanced mode (e.g. asserted). The mode signal is doubled synced through the flops 24A-24B, and is the selection control to the mux 26. Particularly, in the advanced mode, the mode signal causes the mux 26 to select the output of the flop 24E (i.e. the single synced version of the WPtrR from the WPtrR generator 40). The single-synced version is compared (via the comparator 28A) to the RPtr from the flop 24G.

When the FIFO buffer 12 has not been written for at least two RClks, both the flops 24E and 24F have the value of the WPtrR pointer, and the empty signal will be asserted once the RPtr has reached that value. In response to the WClk domain circuitry writing another item of data into the FIFO buffer 12, the WPtr is incremented. The flop 24E receives the incremented WPtrR first, and provides the incremented WPtrR through the mux 26 to the comparator 28A. The incremented WPtrR pointer no longer matches the RPtr, and the comparator 28A deasserts its output signal. The AND gate 30 correspondingly deasserts its output signal (the Empty signal), and thus the RClk domain circuitry is informed that a data item in the FIFO buffer 12 is available for reading.

In the advanced mode, the FIFO control unit 14 may ensure that transitions of the write pointer value meet the setup and hold time requirements in the RClk domain. The setup time is a time prior to an edge of the RClk signal for which the input to a clocked storage device (flop) is required to be stable to ensure that the input is reliably captured by the clocked storage device. The hold time is a time subsequent to the edge of the RClk signal for which the input to the clocked storage device is required to be stable to ensure that the input is reliably captured. Thus, the setup and hold time establish a window around a clock edge for which the value is required to remain stable. If the setup and hold time are met (not violated) by a change in value of the write pointer, the write pointer may be sampled without experiencing metastability problems and thus the single synced output may be used.

In the illustrated embodiment, the mode control unit 38 controls the enable signals to the flops 32I-32J in the WPtrR generator 40 to ensure that setup and hold times in the RClk domain are not violated by a change to the WPtrR value. Particularly, the mode control unit 38 may use the enables to select one of the flops 32I-32J to capture the WPtr value, based on whether the negative edge or positive edge of the WClk is predicted to be "safer" (less likely to violate setup/hold time requirements in the RClk domain) if the WPtr value is changed from its previously captured value. In some cases, neither edge may be viewed as safe and the mode control unit 38 may select neither edge. If the negative edge is selected, the mode control unit 38 may assert the Enn signal to cause the flop 32I to update with the change. The change may propagate to the output of the WPtrR generator 40 shortly after the flop 32I captures the value (responsive to the falling edge of the WClk). If the positive edge is selected, the mode control unit 38 may assert the Enp signal to cause the flop 32J to update to record the change. The change may propagate to the output of the WPtrR generator 40 shortly after the flop 32J captures the value (responsive to the rising edge of the WClk). Accordingly, the change is propagated to the flop 24E at a time that meets the setup/hold time requirements of the flop 24E.

A given change to the WPtr value is captured in one of the flops 32I-32J, dependent on the safe edge at the time the change occurs. Some changes may occur when the negative edge is safer, and other changes may occur when the positive edge is safer. Accordingly, the current value of the WPtr may be represented by a logical combination of the values in the flops 32I-32J. In the illustrated embodiment, the bitwise XOR circuit 52D may generate the current value of the WPtr via a bitwise XOR of the values stored in the flops 32I-32J. The current value (WPtrR) is provided to the RClk domain and also as an input to the bitwise XOR circuit 52A, which receives the (possibly incremented) value of the WPtr from the mux 46. Accordingly, the bitwise XOR circuit 52A may detect which bits of the WPtr have changed, if any, with respect to the WPtrR value. That is, the bit positions output by the XOR circuit 52A that are set indicate bit positions of the WPtr value that differ from the WPtrR value. The bitwise XOR circuits 52B-52C receive the output of the bitwise XOR circuit 52A and the current values in the flops 32I-32J, respectively. Accordingly, the bitwise XOR circuits 52B-52C change the state of the bits in the current values, in the bit positions for which the output of the bitwise XOR circuit 52A indicates a change. Thus, the flop 32I-32J that is selected for update by the mode control unit 38 records the change in the WPtr value, and propagates the change to the output of the WPtrR generator 40. The change is also reflected at the input of the bitwise XOR circuit 52A, and thus the change is not recorded in the non-selected flop 32I-32J at the next WClk edge.

In one embodiment, the mode control unit 38 may determine which edge is safer based on a sample history of the RClk. Since the RClk and the WClk may be of different frequencies, the rising edges of the RClk relative to the rising and falling edges of the WClk may vary from clock cycle to clock cycle. The history of samples may provide an indication of where recent edges of the RClk have been detected, and thus may provide a basis for predicting the next edge of the RClk. The WClk edge (rising or falling) that is farthest from the predicted rising edge of the RClk may be the safer edge to use to propagate a change in the WPtrR value.

It is noted that, if the relationship of the WClk and RClk is such that the setup/hold times are not violated by the change of state of the WPtr, the WPtrR generator 40 may be eliminated. Thus, the WPtrR may be the WPtr. Other embodiments may generate the WPtrR in other fashions (e.g. capturing the WPtr in both the flops 32I-32J and selecting the outputs of the flops 32I-32J according to the prediction of the safe edge of the WClk).

In order to predict the safer edge of the WClk clock for a given WClk clock cycle, the phase of the RClk clock relative to the phase of the WClk rising and falling edges may be predicted. The prediction may be made based on a history of RClk clock samples. According to sampling theory, a signal should be sampled at 2 times (2×) its highest frequency in order to sample the signal without loss of information. In some cases, a clock signal having a frequency 2× of the WClk clock may be generated to sample the RClk clock signal, or a clock signal having the same frequency as the WClk clock signal and 90 degrees out of phase with the WClk clock signal may be used to sample the RClk clock signal.

In the illustrated embodiment, the clock divider circuit 22 is used to divide the RClk frequency by two. The clock divider circuit 22 includes a flop 24H, the output of which is inverted and provided as the input. The flop 24H is clocked by the RClk, and thus the output transitions each RClk clock cycle, providing a signal that oscillates at half the frequency of the RClk clock signal. Other clock divider circuits may divide the frequency by other amounts.

Two samples of the RClk/2 clock signal are captured, one at the rising edge of the WClk clock signal (double synced through the flops 32D-32E, labeled P2 in FIG. 2) and one at the falling edge of the WClk signal (double synced through the flops 32B-32C and captured according to the rising edge through the flop 32A, labeled N2 in FIG. 2). Accordingly, a 2× sampling rate may be achieved. The N3 sample is earlier in time than the P2 sample, and they are adjacent samples in the history 50. A transition in the history 50 (either high to low or low to high) locates a transition in the RClk/2 signal at some point in time between the two samples, which also locates a rising edge of the RClk signal at some point in time between the two samples. The edge may occur at any point between the two samples.

Figures 3, 4:
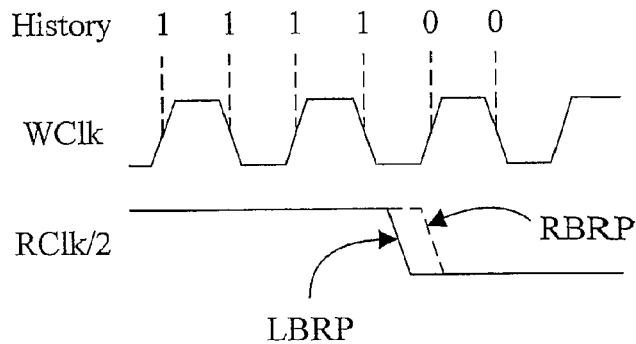
FIG. 3 is a timing diagram illustrating one embodiment of the left and right boundaries of the phase of the transition of the RClk with respect to an edge of the WClk.
FIG. 4 is a set of formulas for different values used in one embodiment in predicting phase relationships between the RClk and WClk.

FIG. 3 is a timing diagram illustrating the uncertainty in the edge of the RClk/2 signal. An exemplary history is shown, sampled at each rising and falling edge of the WClk signal for the RClk/2 signal shown in FIG. 3. A similar example for RClk/2 signal transitioning from 0 to 1 is similar, with the history inverted as compared to that shown in FIG. 3.

A transition from 1 to 0 in the history occurs between the fourth and fifth sample shown in FIG. 3 (corresponding to the second falling edge and the third rising edge of the WClk clock signal as shown in FIG. 3). Accordingly, the RClk/2 signal transitions from 1 to 0 some time between the second falling edge and the third rising edge of the WClk signal. The RClk/2 signal transition may occur as soon as just after the second falling edge, illustrated by the solid line in FIG. 3 labeled LBRP (for left bound RClk phase). The RClk/2 transition may also occur as late as just before the third rising edge, illustrated by the dotted line in FIG. 3 labeled RBRP (for right bound RClk phase). That is, the phase of the RClk rising edge that corresponds to the transition in the RClk/2 signal is bounded on the left by LBRP and on the right by RBRP.

In one embodiment, the LBRP and RBRP (worst case) is estimated for each WClk edge, and is used to predict the phase of the RClk signal with respect to the WClk edges in a given WClk cycle to select an edge of the WClk clock to use for transferring a change in the WPtrR value. There may or may not be a change in the WPtrR value in a given clock cycle, but if a change does occur, it may be transferred safely to the RClk domain without violating setup/hold time requirements of the flop 24E.

Since the RClk frequency is less than or equal to the WClk signal when the advanced mode is used and the sampling rate is 2× the WClk frequency, runs of zeros and ones may be found in the history. A run may be a set of one or more consecutive values of the same state (either zero or one). The run length may be the number of the consecutive values in a given run. Runs may have different lengths (especially for WClk/RClk frequency ratios that are not 1:1 or 1.5:1), since the phase of the rising RClk edge is different for different WClk clock cycles. The average run length is 2 times the ratio of the WClk frequency to the RClk frequency. A particular run length may be identified in the history 50, and for that run length, the LBRP and RBRP may be estimated for worst case. For subsequent clock cycles, the LBRP and RBRP may be estimated from the LBRP and RBRP from the previous clock cycle and the ratio of the WClk and RClk frequencies. The particular run length may be the less likely run length of the possible run lengths for the given ratio or WClk and RClk frequencies. Identifying the less likely run length, estimating the phase using the LBRP and RBRP, and maintaining the LBRP and RBRP for subsequent clock cycles provides an estimated phase relationship between the WClk and the RClk rising edge for each clock cycle. This operation is referred to as a phase relationship lock loop, since the phase relationship (with a certain amount of error) is locked from the particular run length forward until the next particular run length is located. The circuitry is digital in this embodiment, and thus the circuitry may be referred to as a digital phase relationship lock loop.

FIG. 4 is a set of formulas defining the relationships between the RClk and the WClk, for calculating the RBRP and the LBRP, etc. for one embodiment. The first formula listed defines K as the ratio of the frequency of the WClk to the frequency of the RClk. The second formula defines R as the inverse of K. The third formula illustrates that the history is a set of samples, with the oldest samples to the left as shown in FIG. 4. The samples are the positive and negative edge samples of the RClk/2 signal, in time order.

The operation of the phase relationship lock loop may be explained for various categories of K, and for a small epsilon (e), in the range of [1.0−e, 2.0−e] as follows (for n=2 or 3):

$$2n/4-e<=K<=2n/4+e \quad \text{(category 1)}$$

$$2n/4+e<=K<=(2n+1)/4 \quad \text{(category 2)}$$

$$(2n+1)/4<=K<=(2n+2)/4 \quad \text{(category 3)}$$

Figure 8:
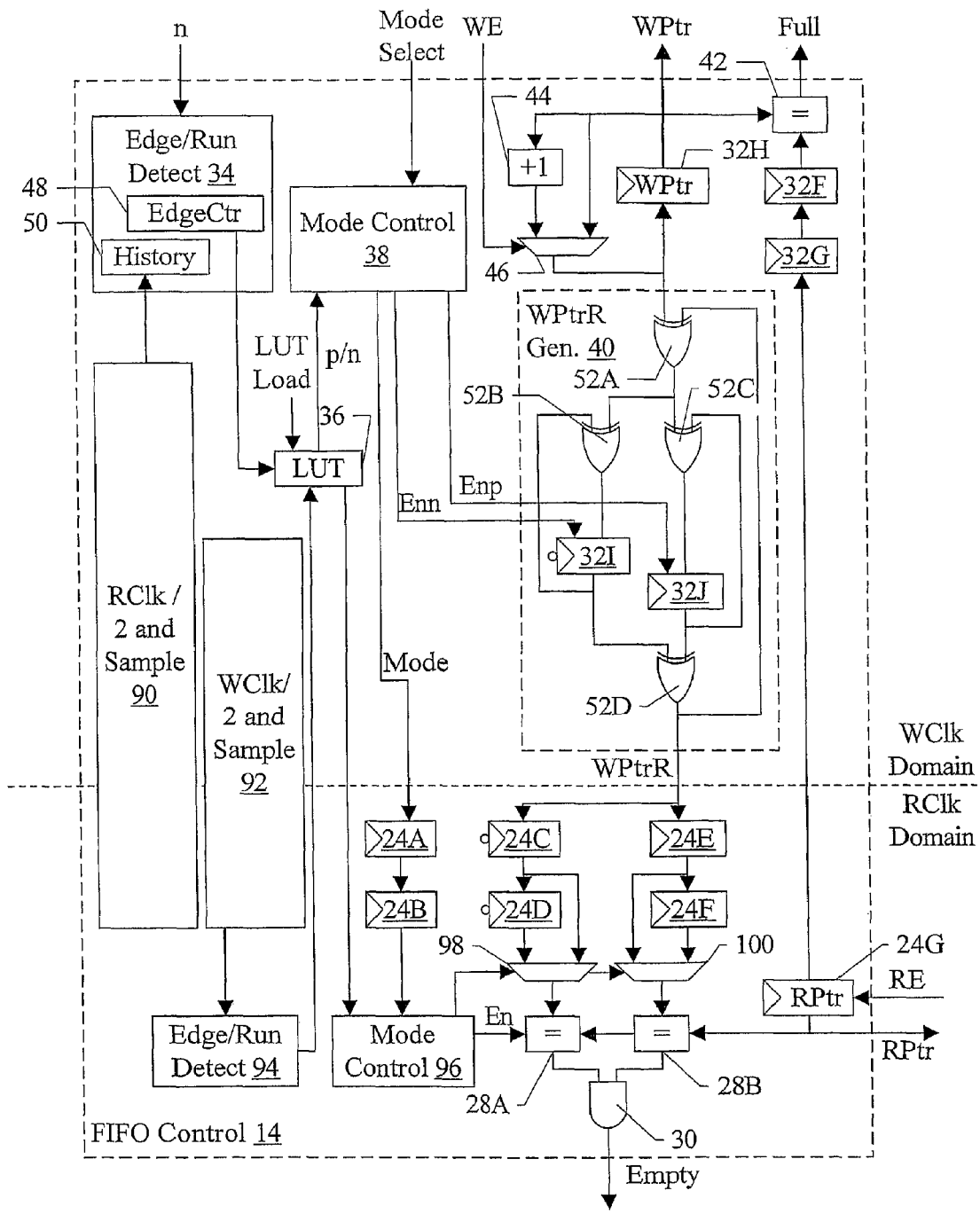
FIG. 8 is a block diagram of another embodiment of the FIFO control unit shown in FIG. 1.

For K<1.0−e, the advanced mode may be disabled (or an embodiment similar to FIG. 8 may be used). Using a 90 degree shifted version of the WClk may be used to sample RClk/2 and the range of K may be extended down to 0.5−e. For K>=2.0−e, the three categories above may also be used. The n will be larger, and the LUT will be larger as well. The precision implemented for the LBRP and RBRP will also be larger. In some embodiments, rather than using the three categories, either the history may be used directly (e.g. as an index to the LUT, described in more detail below), or the same operation as described for the range of [1.0−e, 2.0−e] may be used but fewer samples may be taken (e.g. samples only on the WClk clock positive edge for [2.0−e, 4.0−e], samples only on every other positive edge of the WClk clock for [4.0−e, 8.0−e], etc.).

For category 1, K is equal to 1.0 or 1.5+/−e. In these two ranges, the phase relationship of RClk and WClk is almost stable. In fact, if K were exactly 1.0 or 1.5, the phase relationship would be stable. To ensure that the RClk/2 may be sampled properly, a set of flops similar to the 32A-32E with delay chains on the inputs may be included, with delays sufficient to cover the setup/hold time window of the flops. In one embodiment, this category is not supported for advanced mode (and the double-sync mode may be used).

In another embodiment, advanced mode may be supported for category 1. Generally, if there is no close RClk edge to a WClk edge detected recently, any WClk edge may be safe to use to transfer a change in the WPtrR value. If there is a close edge detected, later WClk edges predicted to be affected may no longer be used until another close edge is detected. In one embodiment, a WClk edge_flag and a phase_counter may be used. The edge_flag may record which type of WClk edge has recently be detected close to an RClk edge. Whenever a close edge is detected, the edge_flag may be updated to indicate the corresponding WClk edge (rising or falling). The phase_counter may be used to predict the arrival of an RClk edge and to determine the affected WClk edge. When close edge is detected, the counter may be set to 4 (2*2 for prediction distance of 2), otherwise, the phase_counter may be incremented by 2 at each WClk rising edge. When the new phase_counter_value>=n, an RClk edge approaches. If ((phase_counter=new_phase_counter_value−n)>0), the opposite WClk edge to the one that edge_flag indicates is affected, otherwise the WClk edge indicated by the edge_flag is affected. The affected edge may not be used to transfer the WPtrR change.

For categories 2 and 3, the digital phase relationship lock loop may be used. Generally, if the less likely run is detected, the RBRP and LBRP may be initialized to worst-case estimates. For subsequent WClk clock cycles, the RBRP and LBRP may be updated to predict the phase relationship for that clock cycle, until the less likely run is again detected. Accordingly, the phase relationship is locked at the detection of the less likely run and remains locked until the next less likely run. Since the phase relationship is an estimate, the error in the phase relationship may accumulate from clock cycle to clock cycle.

The fourth and fifth equations in FIG. 4 illustrate the new (updated) values of LBRP and RBRP for the rising edge of WClk in a WClk clock cycle in which the phase relationship is locked, based on the current values of the LBRP and RBRP. The LBRP and RBRP values for the falling edge of WClk may be different from the values for the rising edge by R/2 (for a 50% duty cycle WClk, or scaled by the duty cycle if not a 50% duty cycle). The new LBRP is the sum of the current LBRP and R− (that is, R rounded toward zero in a desired precision). Since K is greater than one for any value in categories 2 and 3, R is less than one in these categories. The desired precision may be, e.g., 9 bits for category 2 and 10 bits for category 3, in one embodiment. The new RBRP is the sum of current RBRP and R− plus 1 unit in the last place (ulp). LBRP and RBRP may be measured as fractions of a phase. Thus, 1.0 is equal to 0.0 and the addition represented by the fourth and fifth equations in FIG. 4 may be mod 1.0. In some embodiments, R− may be calculated as R minus the per-clock long term phase error (rounded toward zero in the desired precision). R+ may similarly be calculated as R plus the per-clock long term phase error plus 1 ulp. For example, if the RClk and WClk are derived from different sources, such embodiments may be used.

For a given WClk clock cycle, with the above calculations of LBRP and RBRP, a WClk edge may be safe to use if the two equations shown in FIG. 4 under "WClk Edge Ok if:" are met. If the LBRP is less than the RBRP, a valid window for that phase of an RClk edge is defined. If the LBRP is greater than the hold time for a flop, then the RClk edge occurs far enough away from the WClk edge to permit the transmission of a change in WPtrR without violating hold time. If the RBRP is less than the setup time for a flop, then the RClk edge occurs far enough away from the WClk edge to permit WPtrR without violating setup time. It is noted that the measurements for LBRP and RBRP may be adjusted from the setup and hold times to account for other factors (e.g. random jitter, phase to phase jitter, clock skews, etc.).

For category 2, as shown in FIG. 4, the initial values for LBRP and RBRP when the less likely run is detected are nR/2 and 0, respectively. For category 2, run lengths of n+1 are the less likely run lengths. For category 2, the maximum error in the phase relationship may be 0.25*R. Additionally, 2n/4 may be the minimum number of WClk periods that a high or low value on RClk/2 lasts to provide a run length of n+1. Additionally, K is the amount of time (as a function of the period of WClk) that the high or low value actually lasts. Accordingly, K−2n/4 may be the amount of time remaining (as a fraction of the period of WClk) in the high or low value after the run length of n+1 has been satisfied. The left bound is determined as follows:

$LBRP_{Init}=1-\text{remainingtime}*R$, or $LBRP_{Init}=1-(K-2n/4)*R$, or $LBRP_{Init}=1-K*R+2n/4*R$, but $K*R=1$, so $LBRP_{Init}=nR/2$.

The $RBRP_{Init}$ is 1.0 (which is equal to 0.0).

For category 3, as shown in FIG. 4, the initial values for LBRP and RBRP when the less likely run is detected are 2−(n+1)R/2 and 0, respectively. For category 3, run lengths of n are the less likely run lengths. For a maximum error in the phase relationship of 0.25*R, 2(n+1)/4 may be the maximum number of WClk periods that a high or low value on RClk/2 lasts to provide a run length of n. Additionally, K is the amount of time (as a function of the period of WClk) that the high or low value actually lasts. Accordingly, 2(n+1)/4−K may be the amount of time remaining (as a fraction of the period of WClk) in the high or low value after the run length of n has been satisfied. The left bound is determined as follows:

$LBRP_{Init}=1-\text{remainingtime}*R$, or $LBRP_{Init}=1-(2(n+1)/4-K)*R$, or $LBRP_{Init}=1-2R(n+1)/4+K*R$, but $K*R=1$, so $LBRP_{Init}=2-R(n+1)/2$.

Again, the $RBRP_{Init}$ is 1.0 (which is equal to 0.0).

While the LBRP and RBRP may be calculated on the fly, on a clock cycle by clock cycle basis, other embodiments may use the LUT 36 and the edge counter 48. Since the LBRP and RBRP are initialized upon detection of the less-likely run length for a given K, and then are incremented by a fixed value (R− and R−+1 ulp), the sequence of LBRP and RBRP values for a given K and n may be precomputed. Additionally, the determination of which enable to assert for a given LBRP/RBRP pair may be made and the resulting enables may be stored in the LUT 36. The LUT load input may be used to load the LUT 36 for a given K and n, e.g. when either the RClk or WClk frequency is changed (or both).

If the LBRP and RBRP are calculated on the fly, the initial values ($LBRP_{Init}$ and $RBRP_{Init}$) may be compensated for the prediction distance based on the double sync sampling method. Additional lookahead predictions used for easing of timing constraints may also affect the compensation. For example, if LBRP and RBRP are kept one cycle ahead, the adds of R+ and R− to the current values may generate the LBRP and the RBRP for the next clock cycle and the current values of LBRP and RBRP may be compared without addition to determine which clock edge is safe. The one cycle of lookahead plus two cycles for the double sync sampling method leads to compensation of 3. Accordingly, the $LBRP_{Init}$ formulas given above for categories 2 and 3 may have an additional 3*R− added, and the $RBRP_{Init}$ formulas given above for categories 2 and 3 may have an additional 3*R+ added.

The edge counter 48 may be initialized in response to detecting the less-likely run length, dependent on whether the run length is detected at the rising or falling edge of the WClk. For example, the edge counter 48 may be initialized to zero if the run length is detected at the rising edge of the WClk or to one if the run length is detected at the falling edge of the WClk. The edge counter 48 may then be incremented by two for each clock cycle of the WClk, and the edge counter 48 may be used as an index to the LUT 36. Thus, enable values for the falling edge detection may be stored at odd addresses in the LUT 36, and the enable values for the rising edge detection may be stored at even addresses. Other embodiments may reverse the initialization and the storage of enable values for rising and falling edges. The output enable values (p and n, corresponding to the Enp and Enn enable signals, respectively) are provided by the LUT 36 to the mode control unit 38.

K and R may be calculated by a clock frequency analyzer in any desired fashion. For example, K and R may be calculated during operation by measuring the clocks using counters. (WClk_counter and RClk_counter, both clocked by WClk). To calculate K, RClk_counter overflow (roll-over to 0) on a preselected bit may be used to stop the WClk_counter and the value of WClk_counter may be directly used as K with respect to the RClk_counter bit that is used for overflow detection. Vise versa, if R is to be calculated, a preselected bit of WClk_counter may be used to determine when to stop RClk_counter. The RClk_counter value may be used directly as R with respect to the WClk_counter bit that is used for overflow detection to determine the fraction boundary. Note that it may be desirable to have the counters capable of counting the clocks for several seconds so the parameters may be well centered between the error-bounds. As mentioned earlier, the 'n', category type, R−, and LBRP$_{Init}$ may be calculated and recorded. It is noted that the parameters may be shared by all FIFOs that are crossing the same clock boundary. Furthermore, the LUT 36 may be generated by the clock frequency analyzer with a little more cost (a finite state machine and an adder). Also, an LUT 36 may be shared by two or more FIFOs crossing same clock domains in the same direction.

The FIFO control unit 14 may also use the double sync mode for WClk/RClk frequency ratios that are not supported in various embodiments, or during times in which the clock frequency ratios are not settled. To select such a mode, the mode control unit 38 may generate a mode signal through the double sync of the flops 24A-24B to the mux 26 to select the output of the flop 24D as an input to the comparator 28A. In such an embodiment, the flops 24C-24F operate as a dual double synchronizer.

A dual double synchronizer may have a lower average read latency than a double synchronizer. There is approximately a 50% change that the WPtrR changes within the second half of a RClk cycle (or after the falling edge of RClk). In such cases, the flop 24E captures the new state of the WPtrR pointer first. In this case the worst case sync latency, from the time WPtrR changes to the time the empty signal deasserts is 1.5 RClk cycles. The read may be completed at the next RClk rising edge, so the worst case write to read delay is 2.5 RClk cycles.

On the other hand, there is approximately a 50% chance that the WPtrR changes within the first half of a RClk cycle (or before the falling edge of RClk). In such cases, the flop 24C captures the new state of the WPtrR pointer first. In this case the worst case sync latency, from the time WPtrR changes to the time the empty signal deasserts is still 1.5 RClk cycles. However, the read may be completed at the next RClk rising edge, so the worst case write to read delay is 2.0 RClk cycles. Overall, the worst case write to read delay is 2.5 RClk cycles for the dual double sync design (0.5 RClk cycles better than using one double synchronizer).

It is noted that the dual double synchronizer is optional, and the flops 24C-24D may be eliminated if the dual double synchronizer is not implemented. The mux 26 may also be eliminated in favor of enabling the comparator 28A in the advanced mode. Alternatively, the mux 26 may select between the outputs of the flops 24E and 24F for the advanced and double sync modes, respectively.

The WPtr updates are generated by the incrementor 44 and the mux 46, controlled by the WE, in this embodiment. Generally, the incrementor 44 increments the current WPtr value (from the flop 32H) and provides the incremented value to the mux 46. The current WPtr value is provided to the other input of the mux 46. If the WE is deasserted, indicating that no write data is being written to the FIFO buffer 12, the current WPtr value is selected through the mux 26 to the WPtrR generator 40 and the input to the WPtr flop 32H. If the WE is asserted, the incremented pointer is selected through the mux 26. The RPtr in the flop 24G may be updated in a similar fashion, responsive to the RE signal.

In the illustrated embodiment, the RPtr is double synced through the flops 32F-32G to the comparator 42, to generate the full signal. Other embodiments may implement an advanced mode for the RPtr as well. It is further noted that the RPtr and the WPtr may be grey coded, in one embodiment.

The sample history 50 may store enough RClk/2 samples to permit prediction of the RClk phase relationship to the WClk signal, in any desired fashion. For example, the sample history 50 may store at least n+2 samples to permit detection of runs up to length n+1.

It is noted that, while the illustrated embodiment transmits FIFO buffer pointers across a clock domain boundary in the advanced mode, the advanced mode may be used to transmit any one or more bits across a clock domain boundary. The advanced mode need not be implemented within a FIFO, in some embodiments.

Figure 5:
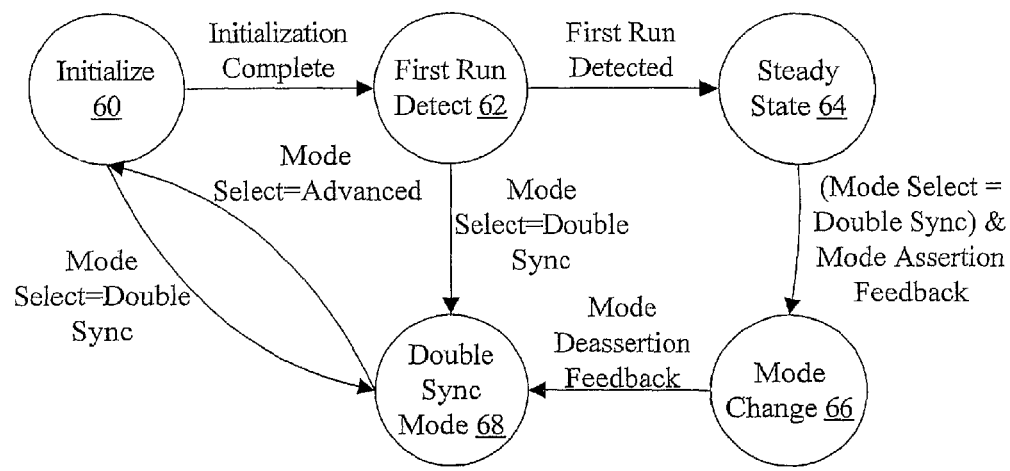
FIG. 5 is a state machine diagram illustrating operation of one embodiment of a mode control unit shown in FIG. 2.

Turning now to FIG. 5, a block diagram of one embodiment of a state machine that may be implemented in one embodiment of the mode control unit 38 is shown.

In the illustrated embodiment, the state machine includes an initialize state 60, a first run detect state 62, a steady state 64, a mode change state 66, and a double sync mode state 68. The advanced mode may be implemented via states 60, 62, 64 and 66, and the double sync mode may be implemented in the double sync state 68.

When attempting to enter advanced mode (e.g. responsive to the mode select input to the FIFO control unit 14 being asserted), the state machine enters the initialization state 60. For example, if the state machine is in the double sync mode 68, the state machine may transition to the initialize state 60. Additionally, the state machine may transition from any state to the initialize state 60 if the frequency of one or both of the RClk and WClk is changed (transitions not shown in FIG. 5). In the initialize state 60, the mode control unit 38 and other circuitry such as the edge/run detector 34 may initialize (e.g. K and R may be calculated, the LUT 36 may be loaded, etc.).

Once the initialization is complete, the state machine may transition to the first run detect state 62. The state machine may remain in the first run detect state 62 until the first run of the desired run length is detected (e.g. length n+1 for category 2, length n for category 3). Once the first run is detected, the mode control unit 38 may transition to the steady state 64. In the steady state 64, the mode control unit 38 may assert the mode signal to the RClk domain (and may initialize the edge counter and begin reading the LUT 36). In the steady state 64, the phase relationship lock loop is functioning and controlling the transmission of the WPtrR to ensure that setup/hold times are not violated in the RClk domain. The mode control unit 38 may generate the Enn and Enp signals based on the n/p inputs to the mode control unit 38 from the LUT 36. For example, if the n/p inputs indicate that the falling edge flop 32I is to capture a change in the WPtrR, the mode control unit 38 may assert the Enn signal. If the n/p inputs indicate that the rising edge flop 32J is to capture a change in the WPtrR, the mode control unit 38 may assert the Enp signal.

If the mode select signal is changed to the double sync mode while the state machine is either in the initialize state 60 or the first run detect state 62, the state machine may transition to the double sync mode state 68 and the mode control unit 38 may operate in double sync mode. If the mode select signal is changed to the double sync mode while the state machine is in the steady state 64, the state machine may transition to the mode change state 66. In the mode change state 66, the mode control unit 38 may deassert the mode signal to the RClk domain while still operating in the advanced mode, and may wait until the mode signal deassertion has been propagated to the mux 26 (and fed back to the mode control unit 38, in one embodiment, as discussed below). The state machine may then transition to the double sync mode state 68. In the illustrated embodiment, an additional condition in the transition from the steady state 64 to the mode change state 66 is that the mode signal assertion has been fed back to the mode control unit 38. A feedback path may be established, for example, from the output of the flop 24B to the mode control unit 38. The feedback path may include double syncing through flops triggered on the rising edge of the WClk, in one embodiment. Delaying the transition to the mode change state 66 may help ensure that a race condition due to the mode select signal changing from double sync to advanced and rapidly back to double sync does not cause incorrect operation. If the mode select signal were to change back to double sync after the steady state 64 is entered but prior to the mode signal assertion being fed back, the state machine could transition to the mode change state 66 and then to the double sync state 68 without waiting for the mode signal assertion (and subsequent deassertion) to propagate to the mux 26. Thus, if the flop 24E captures an invalid pointer value due to setup/hold time violation, the invalid pointer value could be used. By waiting for the mode select signal assertion to be fed back prior to transitioning to the mode change state 66, the race condition may be avoided. Alternatively, the mode change state 66 may be a fixed delay that is long enough to ensure that the mode signal assertion (and subsequent deassertion by the mode change state 66) has been propagated to the mux 26 (and fed back, if desired).

Figure 6:
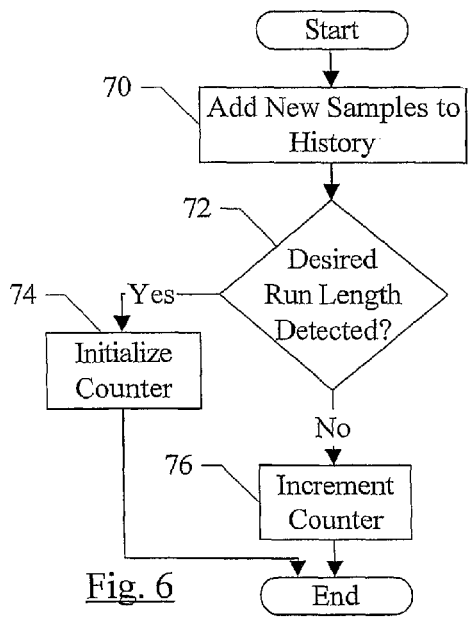
FIG. 6 is a flowchart illustrating operation of one embodiment of an edge/run detector shown in FIG. 2.

Turning next to FIG. 6, a flowchart is shown illustrating operation of one embodiment of the edge/run detector 34 that may be used if the LUT 36 is implemented. While blocks are shown in a particular order for ease of understanding, other orders may be used. Furthermore, blocks may be performed in parallel in combinatorial logic within the edge/run detector 34. Blocks, combinations of blocks, and/or the flowchart as a whole may be pipelined over multiple clock cycles.

The edge/run detector 34 may add the new samples of the RClk/2 signal to the history 50 (block 70). The edge/run detector 34 may analyze the history, and determine if the desired run length has been detected (decision block 72). For example, the desired run length may be n+1 for category 2 or n for category 1. If the edge/run detector 34 detects the desired run length (decision block 72, "yes" leg), the edge/run detector 34 may initialize the edge counter 48 (block 74) to either zero or one, dependent on whether the run length is detected at the rising or falling edge of the WClk. If the edge/run detector 34 did not detect the desired run length (decision block 72, "no" leg), the edge/run detector 34 may increment the edge counter 48 (block 76).

Figure 7:
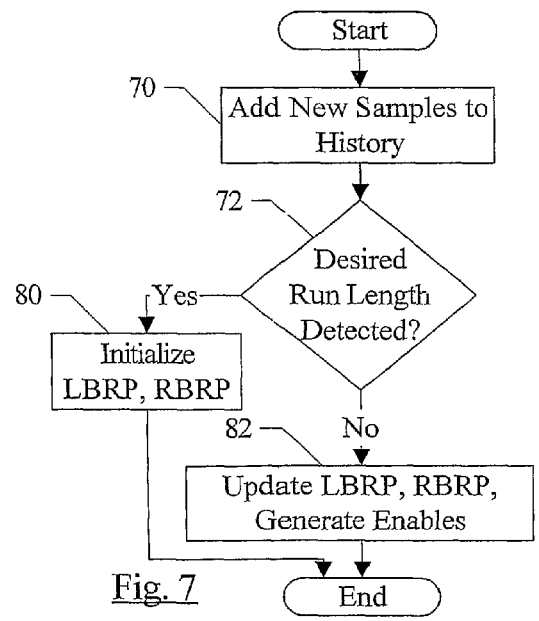
FIG. 7 is a flowchart illustrating operation of another embodiment of the edge/run detector shown in FIG. 2.

Turning now to FIG. 7, a flowchart is shown illustrating operation of one embodiment of the edge/run detector 34 that may be used if on the fly calculation of the LBRP and the RBRP is implemented. While blocks are shown in a particular order for ease of understanding, other orders may be used. Furthermore, blocks may be performed in parallel in combinatorial logic within the edge/run detector 34. Blocks, combinations of blocks, and/or the flowchart as a whole may be pipelined over multiple clock cycles.

The edge/run detector 34 may add the new samples of the RClk/2 signal to the history 50 and may analyze the history to determine if the desired run length has been detected, similar to FIG. 6 (blocks 70 and 72). If the edge/run detector 34 detects the desired run length (decision block 72, "yes" leg), the edge/run detector 34 may initialize the LBRP and RBRP to $LBRP_{Init}$ and $RBRP_{Init}$ as shown in FIG. 4, per the category of K that is in use (block 80). If the edge/run detector 34 did not detect the desired run length (decision block 72, "no" leg), the edge/run detector 34 may update the LBRP and the RBRP, per the fourth and fifth equations shown in FIG. 4. Additionally, the mode control unit 38 may generate the enables Enn and Enp responsive to the LBRP and RBRP values (block 82).

Turning next to FIG. 8, a block diagram of another embodiment of the FIFO control unit 14 is shown. The embodiment of FIG. 8 may be used if either the RClk or the WClk has a higher frequency. Similar to the embodiment of FIG. 2, the embodiment of FIG. 8 includes the edge/run detector 34 (including the history 50 and the edge counter 48), the mode control unit 38, the LUT 36, the incrementor 44, the mux 46, the comparator 42, the flops 32F-32J, the WPtrR generator 40, the bitwise XOR circuits 52A-52D, the flops 24A-24G, the comparators 28A-28B, and the AND gate 30. An RClk/2 and sample block 90 may comprise the flops 32A-32E and the clock divider 22. A similar clock divider in the WClk domain and flops in the RClk domain may comprise a WClk/2 and sample block 92 coupled to an edge/run detector 94. The edge/run detector 94 may be similar to the edge/run detector 34 and may include a sample history and edge counter. The output of the edge counter may be coupled to the LUT 36, which may provide an output to the mode control unit 96. The mode control unit 96 may generate mux controls for muxes 98 and 100. The mux 98 may have inputs coupled to the flops 24C-24D and an output coupled to the comparator 28A. The mux 100 may have inputs coupled to the flops 24E-24F and an output coupled to the comparator 28B. The comparators 28A-28B may also have an enable input coupled to the mode control unit 96.

If the frequency of the WClk is greater than the frequency of the RClk, the embodiment of FIG. 8 may operate similar to the embodiment of FIG. 2 via the RClk/2 and sample block 90, the edge/run detector 34, the mode control unit 38, the LUT 36, the WPtrR generator 40, and the flops 24E-24F. The mux 100 may select the flop 24E in the advanced mode (and the comparator 28A may be disabled). The mode control unit 96 may generate the mux selects and the enables for the comparators 28A-28B in response to the advanced mode indication on the mode input from the mode control unit 38. Additionally, if double sync mode is selected, the mode control unit 96 may select the flops 24D and 24F through the muxes 98 and 100, respectively, and enable both comparators 28A-28B.

If the frequency of the RClk is greater than the frequency of the WClk, the edge/run detector 94 may monitor the WClk clock edges and detect runs, similar to the operation of the edge/run detector 34. The edge/run detector 94 may control an edge counter in a similar fashion, which may be used as a read address to the LUT 36. In one embodiment, the LUT 36 may be dual-ported. In another embodiment, a mux may select between the edge counter input from the edge/run detector 34 and from the edge/run detector 94. The mode control unit 96 may receive the p/n output of the LUT 36. The mode control unit 96 may implement a state machine similar to the state machine of FIG. 5, except that the mode change state 66 may not be needed. The mode control unit 96 may select the outputs of flops 24C and 24E in the advanced mode, in one embodiment, dependent on which RClk edges are determined to be safe.

In other embodiments, if supporting the RClk only at higher frequencies than the WClk for advanced mode, the edge/run detector 34, the RClk/2 and sample block 90, the mode control unit 38, and the WPtrR generator 40 may be eliminated and the flops 24C and 24E may receive the WPtr directly.

It is noted that, while specific logic circuitry such as muxes, AND gates, bitwise XOR circuits, etc. have been shown in the drawings and described above, any circuitry may be used. Specifically, any Boolean equivalents to the illustrated circuitry may be used.

It is noted that, in some embodiments, the edge/run detector 34, the mode control unit 38, and the reading of the LUT 36 in a fashion that these elements appear to operated at twice the WClk frequency by utilizing both the rising and falling edges of the WClk. In such embodiments, the history may be evaluated at each edge, the edge counter may be incremented at each edge, the LUT may be read one bit at a time, and either the Enn or Enp may be the signal of interest at each edge.

Numerous variations and modifications will become apparent to those skilled in the art once the above disclosure is fully appreciated. It is intended that the following claims be interpreted to embrace all such variations and modifications.

What is claimed is:

1. A control unit for a first-in, first-out (FIFO) buffer for transferring data between a first clock domain corresponding to a first clock signal and a second clock domain corresponding to a second signal, the control unit comprising:
    a first clocked storage device clocked by the first clock signal, wherein the first clocked storage device is configured to store a first pointer to address the FIFO buffer;
    a second clocked storage device clocked by the second clock signal, wherein the second clocked storage device is configured to store a second pointer to address the FIFO buffer;
    a third clocked storage device clocked by the second clock signal, wherein the third clocked storage device is coupled to receive a third pointer that corresponds to the first pointer, the third pointer transmitted from the first clock domain to the second clock domain to be received by the third clocked storage device;
    a fourth clocked storage device having an input coupled to an output of the third clocked storage device and clocked by the second clock signal;
    a detect circuit that includes a sample storage device configured to store a sample history corresponding to a selected clock signal derived from one of the first clock signal or the second clock signal, wherein the sample history stored in the sample storage device includes samples from a plurality of clock cycles of the selected clock signal, and wherein the detect circuit is configured to predict a first phase relationship between the first clock signal and the second clock signal for a given clock cycle responsive to the sample history, and wherein the phase relationship between the first clock signal and the second clock signal is different each clock cycle during use; and
    a mode control unit configured to determine whether or not a transition in a value of the third pointer meets the setup and hold requirements of the third clocked storage device in the given clock cycle according to the first phase relationship between the second clock signal and the third clock signal as predicted by the detect circuit, and wherein the mode control unit is configured to select the output of the third clocked storage device to be compared to the second pointer responsive to determining that the transition in the value does meet the setup and hold requirements.

2. The control unit as recited in claim 1 further comprising a clock divider in the second clock domain, wherein the clock divider is configured to generate the selected clock signal, wherein a frequency of the second clock signal is an integer multiple of the selected clock signal.

3. The control unit as recited in claim 2 further comprising a plurality of clocked storage devices, wherein each of the clocked storage devices are triggered by either a rising edge or a falling edge of the first clock signal, and wherein the plurality of clocked storage devices are configured to synchronize the selected clock signal to the first clock domain.

4. The control unit as recited in claim 1 wherein the detect circuit is configured to detect run lengths in the sample history, and wherein a plurality of possible run lengths have respective likelihoods of occurrence dependent on a ratio of a first frequency of the first clock signal and a second frequency of the second clock signal, and wherein the detect circuit is configured to initialize one or more values to track the phase relationship between the first clock signal and the second clock signal responsive to detecting a least likely of the plurality of possible run lengths in the sample history.

5. The control unit as recited in claim 4 wherein the run length is a number of consecutive samples having the same value.

6. The control unit as recited in claim 1 wherein the mode control unit is configured to generate a select signal to select the third clocked storage device, wherein the select signal is double synchronized to the second clock domain.

7. The control unit as recited in claim 6 further comprising:
    a first comparator coupled to receive the selected output of the third clocked storage device and coupled to receive the second pointer, the first comparator configured to generate a first comparison result;
    a second comparator coupled to receive the output of the fourth clocked storage device and coupled to receive the second pointer, the second comparator configured to generate a second comparison result; and
    a logic gate configured to logically AND the first comparison result and the second comparison result.

8. The control unit as recited in claim 1 further comprising a fifth clocked storage device coupled to receive the third pointer and clocked by the second clock signal, wherein the fifth clocked storage device is configured to capture the third pointer on an opposite edge of the second clock signal than the third clocked storage device.

9. The control unit as recited in claim 8 wherein the mode control unit is configured to select the output of the fifth clocked storage device to be compared to the second pointer responsive to determining that the transition in the value from the third clocked storage device does not meet the setup and hold requirements.

10. In a first-in, first-out (FIFO) buffer for transferring data between a first clock domain corresponding to a first clock signal and a second clock domain corresponding to a second signal, wherein a first pointer in the first clock domain addresses the FIFO buffer and a second pointer in the second clock domain addresses the FIFO buffer, a method comprising:
    a detect circuit monitoring a sample history corresponding to a first selected clock signal derived from one of the first clock signal or the second clock signal;
    the detect circuit predicting a first phase relationship between the first clock signal and the second clock signal for a given clock cycle responsive to the sample history, wherein the phase relationship between the first clock signal and the second clock signal is different each clock cycle;
    a mode control unit determining that a transition in a value of a third pointer that corresponds to the first pointer meets the setup and hold requirements of the third clocked storage device in the given clock cycle according to the first phase relationship between the second clock signal and the third clock signal as predicted by the detect circuit; and the mode control unit selecting the third pointer to be compared to the second pointer responsive to determining that the transition in the value does meet the setup and hold requirements.

11. The method as recited in claim 10 wherein a second selected clock signal of the first and second clock signal is an opposite one of the first and second clock signal from the selected clock signal, and the method further comprising:
the mode control unit determining, from the first phase relationship predicted by the detect circuit, which edge of the second selected clock signal is farthest, in time, from a current edge of the first selected clock signal in the given clock cycle;
the mode control unit causing a capture of the third pointer in the second clock domain responsive to the edge that is determined to be farthest from the current edge; and
the control unit comparing the third pointer captured according to the edge that is determined to be the farthest from the current edge to the second pointer.

12. The method as recited in claim 10 further comprising:
the detect circuit detecting run lengths in the sample history, wherein a plurality of possible run lengths have respective likelihoods of occurrence dependent on a ratio of a first frequency of the first clock signal and a second frequency of the second clock signal;
the detect circuit predicting the first phase relationship responsive to the detecting run lengths.

13. The method as recited in claim 12 wherein the run length is a number of consecutive samples having the same value.

14. The method as recited in claim 12 further comprising:
the control unit initializing one or more values to track a phase relationship between the first clock signal and the second clock signal responsive to detecting a least likely of the plurality of possible run lengths in the sample history.

15. The method as recited in claim 14 further comprising:
the control unit comparing the third pointer to the second pointer to generate a first comparison result;
the control unit comparing a fourth pointer to the second pointer to generate a second comparison result, the fourth pointer captured in the second clock domain from the third pointer; and
the control unit logically combining the first comparison result and the second comparison result to generate a combined comparison result used to detect whether the FIFO is full or empty.

16. The method as recited in claim 15 further comprising a clock divider, in the second clock domain, generating the selected clock signal, wherein a frequency of the second clock signal is an integer multiple of the selected clock signal.

17. The method as recited in claim 16 further comprising a plurality of clocked storage devices, each of the plurality of clocked storage devices triggered by either a rising edge or a falling edge of the first clock signal, synchronizing the selected clock signal to the first clock domain.

18. The method as recited in claim 17 wherein the sample history is a history of samples of the selected clock signal as synchronized to the first clock domain.

19. The method as recited in claim 10 further comprising:
the mode control unit generating a select signal to select the third pointer; and
double-synchronizing the select signal to the second clock domain.

20. The method as recited in claim 10 further comprising:
capturing the third pointer on an opposite edge of the second clock signal as a fourth pointer; and
selecting the fifth pointer to be compared to the second pointer responsive to determining that the transition in the value of the third pointer does not meet the setup and hold requirements.

* * * * *